Patented June 28, 1938

2,122,389

UNITED STATES PATENT OFFICE 2,122,389

ANIMAL DIP

Robert L. Sibley, Nitro, W. Va., assignor, by mesne assignments, to Monsanto Chemical Company, St. Louis, Mo., a corporation of Delaware No Drawing. Application February 17, 1934, Serial No. 711,824

4 Claims. (Cl. 167—36)

The present invention relates to animal dips and more particularly to a new and improved composition suitable for use in an animal dip wherein the effectiveness thereof is greatly increased.

In combating the sarcoptic itch (or scab) and similar skin parasites, particularly in sheep, baths are used which frequently contain active ingredients which are not readily wet, and consequently are not easily miscible with water. Such products have little tendency to remain in suspension, necessitating continuous mechanical stirring of the bath. This defect detracts from their certainty of action.

Furthermore, in combating sheep and cattle ticks, dips have been extensively used, wherein cresols have been employed in combination with nicotine. Such a composition has the disadvantage that complete solution or suspension in water is frequently not effected. In consequence thereof the effectiveness of the dip is markedly decreased.

Furthermore, many of the animal dips, though soluble or readily suspended in the medium employed, still are ineffective due to their inefficient spreading on or covering of the skin and hair of the animal dipped or washed.

According to the present invention, animal dips are markedly improved and the disadvantages hereinbefore set forth substantially eliminated by incorporating therewith a small proportion of a product obtainable by treating with sulfuric acid a reaction product of an alcohol and a non-condensed aromatic compound.

As examples of the preferred class of compounds, which may be employed in conjunction with the usual animal dips, are the following materials which are conveniently prepared in a manner analogous to that set forth in my U. S. Patent 1,921,546 granted August 8, 1933: the sodium salt of the sulfuric acid derivative of the reaction product of diphenyl and normal butyl alcohol, said product being obtainable in a manner analogous to that described in Example I of the aforementioned patent by substituting diphenyl for hydroxy diphenyl, the sodium salt of the sulfuric acid derivative of the reaction product of ortho hydroxy diphenyl and normal butyl alcohol, the sodium salt of the sulfuric acid derivative of the reaction product of normal butyl alcohol and a mixture of ortho and para hydroxy diphenyl, the sodium salt of the sulfuric acid derivative of the reaction product of phenol and normal amyl alcohol, the potassium salt of the sulfuric acid derivative of the reaction product of ortho cresol and normal butyl alcohol, the sodium salt of the sulfuric acid derivative of the reaction product of para hydroxy diphenyl and normal butyl alcohol, the potassium and ammonium salts of the sulfuric acid derivatives of the reaction products of ortho hydroxy diphenyl and iso butyl alcohol, octyl alcohol, cetyl alcohol, cyclohexanol and benzyl alcohol respectively.

The following examples are to be understood as specific embodiments of the invention and not as limitations thereof.

Example I

A desirable animal dip is prepared comprising:

| | Pounds |
|---|---|
| Sugar of lead | 2.0 |
| Arsenic | 2.0 |
| Flowers of sulfur | 2.0 |
| Caustic soda | 0.5 |
| Soft soap | 2.0 |
| Sodium salt of the sulfuric acid derivative of the reaction product of ortho hydroxy diphenyl and normal butyl alcohol | 2.0 |

It is preferred that the arsenic and caustic soda be dissolved in a small quantity of water, the other ingredients are then added, the product stirred well and made up to 40 gallons with water. If desired, the dip prepared as described, may be further diluted with water, and then applied to the animal in the usual manner.

Example II

An animal dip is prepared comprising:

| | |
|---|---|
| Tobacco water | 2.0 gallons |
| Powdered hellebore | 0.5 pound |
| Caustic soda | 0.5 pound |
| Black sulfur | 0.5 pound |
| Turpentine | 1.0 pint |
| Sodium salt of the sulfuric acid derivative of the reaction product of diphenyl and normal butyl alcohol | 2.0 pounds |

The materials given above are mixed together and made up to 40 gallons with water, whereupon a very desirable animal dip is obtained.

Example III

A sheep dip having the desirable properties hereinbefore set forth is prepared from:

| | |
|---|---|
| Flowers of sulfur | 20.0 pounds |
| Fresh slaked lime | 10.0 pounds |
| Calcium salt of the sulfuric acid derivative of the reaction product of ortho hydroxy diphenyl and amyl alcohol | 8.0 pounds |
| Water | 100.0 gallons |

Example IV

A composition is made up comprising:

| | |
|---|---|
| Water | 24.0 gallons |
| Soluble creosote | 3.0 pints |
| Potassium salt of the sulfuric acid derivative of the reaction product of para hydroxy diphenyl and cyclohexanol | 2.0 pounds |

The above wash is very desirable as a mange lotion for dogs and cattle.

Example V

As a liquid sheep dip, the following is employed:

| | |
|---|---|
| Crude carbolic acid | 6.0 pints |
| Soft soap | 5.0 pounds |
| Sodium salt of the sulfuric acid derivative of the reaction product of normal butyl alcohol and a mixture of 95% ortho and 5% para hydroxy diphenyl | 10.0 pounds |

The above materials, after mixing and diluting with water to make a total of 100 gallons, comprise a valuable sheep dip.

If convenient or desirable, the free sulfuric acid derivative may be employed in place of the water soluble salts above described.

By the term alkali metal as appearing in the following claims is meant members of the alkali metal series and the ammonium ($NH_4$) radical.

The preferred class of compounds may be employed with other active ingredients of animal dips than those specifically disclosed herein as is readily apparent to those skilled in the art to which the invention pertains. The present invention is limited solely by the claims attached hereto as part of this specification.

What is claimed is:

1. Animal dip containing an alkali metal salt of a sulfuric acid derivative of the reaction product of an aliphatic monohydric alcohol and diphenyl.

2. Animal dip containing the sodium salt of a sulfuric acid derivative of the reaction product of normal butyl alcohol and diphenyl.

3. Animal dip comprising an arsenic and sulfur containing mixture and an alkali metal salt of a sulfuric acid derivative of the reaction product of an aliphatic monohydric alcohol and diphenyl.

4. Animal dip comprising an arsenic and sulfur containing mixture and the sodium salt of a sulfuric acid derivative of the reaction product of butyl alcohol and diphenyl.

ROBERT L. SIBLEY.